United States Patent

[11] 3,616,361

[72] Inventors Jane M. Picone
Peekskill;
Rangaswamy Srinivasan, Ossining, both of N.Y.
[21] Appl. No. 845,560
[22] Filed July 28, 1969
[45] Patented Oct. 26, 1971
[73] Assignee International Business Machines Corporation
Armonk, N.Y.

[54] PHOTOCHEMICAL METHOD OF PREPARING CYCLOBUTANE CARBOXALDEHYDES
9 Claims, No Drawings

[52] U.S. Cl. .................................................. 204/158
[51] Int. Cl. .................................................. B01j 1/10
[50] Field of Search .................................... 204/158 R

[56] References Cited
OTHER REFERENCES

Ellis et al., The Chemical Action of Ultraviolet Rays (1941) pg. 268

*Primary Examiner*—Howard S. Williams
*Attorneys*—Hanifin and Jancin and Hansel L. McGee ABSTRACT: Cyclobutane carboxaldehydes having the general formula:

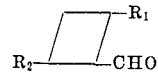

where $R_1$ and $R_2$ can be H, $CH_3$, $OC_2H_5$, and CHO, are prepared from a 3,4 dihydro-[2H]-pyran and its derivatives. A pyran derivative is exposed to actinic radiation for a time sufficient to cause the photoisomerization thereof into the corresponding cyclobutane carboxaldehydes. The reaction may be characterized as:

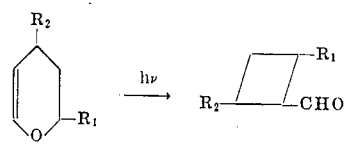

the cyclobutane carboxaldehydes thus produced can be utilized as high-energy fuels. They can also be used as monomeric starting materials for preparing rigid polymers of the type shown and described in the publication to W. W. Moyes, et al., Journal Polymer Science, 1, 29 (1963).

PHOTOCHEMICAL METHOD OF PREPARING CYCLOBUTANE CARBOXALDEHYDES

BACKGROUND OF THE INVENTION

This invention relates to a method of converting 3,4 dihydro-(2H)-pyran and its derivatives to cyclobutane carboxaldehyde; more particularly this invention relates to the photoisomerization of 3,4 dihydro-(2H)-pyrans to produce cyclobutane carboxaldehydes and substituted derivatives thereof.

DESCRIPTION OF THE PRIOR ART

Bicyclobutanes have been of interest because of their possible use as energy-rich fuels. Recently, a novel photochemical method for preparing unsubstituted bicyclobutane has been disclosed in U.S. Pat, No. 3,427,241, issued on Feb. 11, 1969, to R. Srinivasan. In the above patent, bicyclobutane was obtained as the product of the photolysis of 1,3dienes. In the present invention, it is desirous of preparing substituted cyclobutanes from 3,4 dihydro-(2H)-pyran and its derivatives.

Until the present invention there has been no known photochemical method for converting pyrans into substituted cyclobutanes of the type contemplated herein, although these compounds have been tediously prepared by wet chemical methods.

SUMMARY OF THE INVENTION

In accordance with an aspect of this invention, the objects of the invention are achieved by a novel process which comprises exposing a 3,4 dihydro-(2H)-pyran to actinic radiation having a wavelength of from about 2,000 A. to about 3,200 A.

In general, 3,4 dihydro-(2H)-pyran and its derivatives will undergo photoisomerization to a corresponding cyclobutane carboxaldehyde. Those derivatives that do not readily absorb actinic radiation in the region 2,000 A. to about 3,200 A., can be made to undergo photoisomerization by irradiating them in the gas phase with or without a sensitizer in the far ultraviolet light region. Where a sensitizer such as mercury, is used photoisomerization can be made to occur at the Hg resonance line of the ultraviolet light region, viz, 2,537 A. Where the particular 3,4 dihydro-(2H)-pyran readily absorbs actinic radiation, the photoisomerization can be made to occur in solution.

OBJECTS OF THE INVENTION

It is therefore, an object of this invention to provide an improved method of producing cyclobutane carboxaldehyde and substituted derivatives thereof.

Another object of this invention is to provide a photochemical method of producing cyclobutane carboxaldehyde and substituted derivatives thereof.

And yet another object of this invention is to provide a photochemical method of producing cyclobutane carboxaldehyde and substituted derivatives thereof from 3,4 dihydro-(2H)-pyran and derivatives thereof.

The foregoing and other objects and advantages of the invention will be apparent from the following more particular description of the invention as illustrated in the examples.

DESCRIPTION OF THE PREFERRED EMBODIMENTS

The starting materials used in this invention are 3,4dihydro-(2H)-pyrans having the general formula:

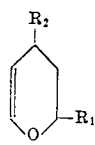

where $R_1$ and $R_2$ can be H, $CH_3$, $C_2H_5$ or CHO. $R_1$ and $R_2$ can be the same radical or any combination of the above radicals. Some of the starting materials are available commercially as the byproducts obtained from the corn products industry. These materials may also be synthesized by the Diels-Alder addition of $\alpha,\beta$unsaturated carbonyl compounds to suitable dienophiles. Such synthetic methods are taught by Longley, et al., J.A.C.S. 72, 3079 (1950) and Smith et al., J.A.C.S. 73, 5267 (1951).

In the process of the invention, 3,4 dihydro-(2H)-pyran or a derivative thereof, in a suitable solvent, such as, saturated hydrocarbons, e.g., cyclohexane or ethers, is placed in a flask with or without a sensitizer, such as, Hg Attached to the flask is a quartz tube having mounted thereon a reflux condenser. The solution is heated to a temperature sufficient to cause refluxing of the solution. The refluxing solution is irradiated, through the quartz tube, with an ultraviolet radiation source. After about 8 hours or more of exposure, refluxing is stopped and the solution is fractionally distilled. The resulting cyclobutane carboxaldehyde is then separated from the biproducts of the reaction, viz, acrolein and ethylene, by vapor phase chromatography.

Irradiation is accomplished by utilizing any well-known actinic light source which provides radiation in the wavelength range below 3,200 A. A low-pressure mercury light source, however, is preferable in practicing the present invention. Mercury lamps such as commercially available germicidal lamps provide an easily obtainable and inexpensive light source. High-pressure mercury arc lamps in the 1,000 range, may also be utilized. Irradiation can be undertaken at a wavelength of 2,537 A. using a bank of 16 low-pressure mercury lamps arrayed in circular fashion about a reaction cell in which the photolysis is carried out. In this manner, the reaction cell is subjected to high-intensity radiation and intensities of the order of $10^{15}$-$10^{17}$ quanta/sec. are absorbed at the cell; in the present invention at the quartz tube aforementioned.

For the purposes of this invention, a spiral mercury resonance lamp which was operated from a neon sign transformer was used as the light source. It should be appreciated that other light sources and lamp arrays can be utilized without departing from the spirit of this invention.

The following examples are illustrative of the preferred embodiments of the invention and are not to be considered as limiting thereto.

EXAMPLE I

A reaction vessel, having attached thereto a quartz tube and a reflux condenser, containing 40 ml. of 3,4 dihydro-(2H)-pyran and 1 g. of Hg, is heated to the boiling temperature of the charge to cause the same to reflux. The refluxing charge is irradiated for about 8 hours with light from the spiral mercury lamp which is fitted about the quartz tube having a wavelength of about 2,537 A. After irradiation is completed, the charge is fractionated on a fractioning column. Unreacted 3,4 dihydro-(2H)-pyran is collected and the residue is gas chromatographed to give 2.5 ml. of cyclobutane carboxaldehyde.

The identity of the product was established from the following considerations:

Infrared spectrum—intense absorptions at 1,725 and 2,700 cm.[11].

Nuclear Magnetic Resonance (NMR)—0.30 $\tau$(1H); 6.8$\tau$ (1H); 7.8$\tau$ (6H)

m.p. of the 2,4 dinitrophenyl-hydrazone—- 152.5–154. Literature value 152–155 B.C. Roquitte, et al., J.A.C.S. 84, 4049 (1962)

Refractive Index 1.4339 (22° C.) Literature value 1.4310— Loc. cit.

The product had a molecular weight of 84 as determined by mass spectrometry.

EXAMPLE II

A solution containing 2 percent of 2,5 dimethyl-3,4 dihydro-(2H)-pyran-2-carboxaldehyde in cyclohexane was irradiated with light having a wavelength of 3,130 A. for 18 hours, in the same fashion described in example I. After fractional distillation and chromatographing of the residue, 0.5 ml. of 1,2-dimethyl cyclobutane-1,2-carboxaldehyde was obtained.

The identity of the product was established from the following considerations:
Mol. Wt.—140 by mass spectrometry.
Infrared Spectrum: CHO absorptions at 1,725 and 2,700 - CH₃ absorptions at 1,378.
NMR—0.32τ (2H); 7.2–9.2(τ) (10H)

As indicated above, the process described can be applied to all 3,4 dihydro-(2H)-pyrans. Those that do not absorb light readily in the near ultraviolet, e.g., example I, can be caused to react by irradiating them in the gas phase directly, i.e., without a sensitizer, with far ultraviolet light or with a sensitizer at 2,537 A. Those pyrans that readily absorb in the near ultraviolet region, as in example II, can be irradiated in solution.

The products resulting from the method of this invention have utility as high-energy fuels and may also be utilized as starting materials for the preparation of rigid fibrous materials.

While the invention has been particularly described with reference to specific examples thereof, it will be understood by those skilled in the art that various changes in procedure may be made therein without departing from the spirit and scope of the invention.

What is claimed is:
1. A method of preparing cyclobutane carboxaldehydes having the general formula:

where $R_1$ and $R_2$ can be selected from at least one of the group consisting of H, $CH_3$, $OC_2H_5$, and CHO, comprising the step of:
  a. irradiating unsubstituted and substituted 3,4 dihydro-(2H)-pyrans with actinic light having a wavelength less than 3,200 A. to convert said 3,4 dihydor-(2H)-pyran to a corresponding cyclobutane carboxaldehyde.

2. A method according to claim 1 wherein said 3,4 dihydro-(2H)-pyran is irradiated in the presence of a mercury sensitizer.

3. A method according to claim 2 wherein said 3,4 dihydro-(2H)-pyran is irradiated with actinic light having a wavelength of 2,537 A.

4. A method according to claim 3 wherein said 3,4 dihydro-(2H)-pyran is unsubstituted and is converted to cyclobutane carboxaldehyde.

5. A method according to claim 1 wherein said 3,4 dihydro-(2H)-pyrans is irradiated in solution in which a saturated hydrocarbon or ether is the solvent.

6. A method according to claim 5 wherein said pyran is 2,5 dimethyl-3,4 dihydro-(2H)-pyran-2-carboxaldehyde and in converted to 1,2-dimethyl cyclobutane-1,2-carboxaldehyde.

7. A method according to claim 6 wherein said pyran is irradiated with actinic light having a wavelength of 3,130 A.

8. A method according to claim 1 wherein there is included the further step of fractionally distilling the irradiated pyran to obtain the desired cyclobutane carboxaldehyde.

9. A method according to claim 8 wherein there is included the further step of purifying said desired cyclobutane carboxaldehyde by gas chromatography.